United States Patent
Duenyas et al.

(10) Patent No.: US 11,570,384 B2
(45) Date of Patent: Jan. 31, 2023

(54) IMAGE SENSOR EMPLOYING VARIED INTRA-FRAME ANALOG BINNING

(71) Applicant: SAMSUNG ELECTRONICS CO., LTD., Suwon-si (KR)

(72) Inventors: Shahaf Duenyas, Yavne (IL); Yoel Yaffe, Modiin (IL); Guy Horowitz, Kfar Saba (IL); Amit Eisenberg, Kiryat Ono (IL); Shy Hamami, Ganei-Tikva (IL); Oded Monzon, Modiin (IL); Gal Bitan, Petach Tikva (IL); Yoav Piepsh, Holon (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 153 days.

(21) Appl. No.: 17/011,227

(22) Filed: Sep. 3, 2020

(65) Prior Publication Data
US 2022/0070391 A1    Mar. 3, 2022

(51) Int. Cl.
*H04N 5/341* (2011.01)
*H04N 5/343* (2011.01)
*H04N 5/347* (2011.01)

(52) U.S. Cl.
CPC ............ *H04N 5/343* (2013.01); *H04N 5/347* (2013.01)

(58) Field of Classification Search
None
See application file for complete search history.

(56) References Cited

U.S. PATENT DOCUMENTS

| | | | |
|---|---|---|---|
| 5,949,483 A | 9/1999 | Fossum et al. | |
| 8,089,522 B2 | 1/2012 | Choi et al. | |
| 9,179,085 B1* | 11/2015 | Rivard | H04N 5/347 |
| 2008/0129844 A1 | 6/2008 | Cusack et al. | |
| 2008/0317379 A1* | 12/2008 | Steinberg | G06T 5/003 |
| | | | 382/275 |
| 2009/0225189 A1* | 9/2009 | Morin | H04N 5/3454 |
| | | | 348/222.1 |
| 2013/0141586 A1* | 6/2013 | Kozitsky | G06Q 10/087 |
| | | | 348/150 |
| 2016/0048988 A1* | 2/2016 | Lee | G06T 11/60 |
| | | | 345/629 |
| 2016/0081661 A1* | 3/2016 | Lee | G01S 7/52061 |
| | | | 600/443 |
| 2017/0054925 A1 | 2/2017 | Honda | |

* cited by examiner

*Primary Examiner* — Mark T Monk
(74) *Attorney, Agent, or Firm* — F. Chau & Associates, LLC

(57) ABSTRACT

A method performed with an image sensor having a pixel array. At least one frame of a scene may be obtained using the pixel array. At least one region of interest (ROI) is identified within the frame. Subsequent frames of the scene are obtained, which involves controlling the pixel array to perform high resolution imaging with respect to the at least one ROI and low resolution imaging using analog binning with respect to remaining regions of the frames.

21 Claims, 7 Drawing Sheets

IMAGE SENSOR EMPLOYING VARIED INTRA-FRAME ANALOG BINNING

TECHNICAL FIELD

The present disclosure relates generally to image capture, processing and display systems, and more particularly to reducing power consumption and processing complexity in image sensors.

DISCUSSION OF THE RELATED ART

Multi region of interest (ROI) smart zoom capability in an imaging system allows for the detection of ROIs such as faces or license plates within a scene. The ROIs may be selectively enlarged (zoomed), and the zoomed regions superposed with full field of view video of the scene to create a picture in picture (PIP) view on a display.

Current methods for generating such multi ROI smart zoom operations with PIP typically require high power consumption within an image sensor. In an image sensor, power consumption may be correlated with the amount of pixel data processed. Moreover, high frame rates are desirable for high speed video capture. The highest available frame rate may be impacted by horizontal time ("h-time") limitations and the number of rows in the image sensor pixel array. (H-time is the time a single image row is processed by the digital part of the sensor.) In one approach to multi ROI smart zooming, a highest available resolution ("full resolution") image over the entire pixel array of the sensor may be processed. ROIs are then cropped and a resulting video stream is then downscaled with an application processor. An alternative approach uses a multi-sensor system, where each sensor provides a different resolution of a specific type of ROI. These options typically require high power consumption and high data transmission rates, limiting the frame rate and image processing capabilities on the sensor due to h-time limitations.

SUMMARY

Embodiments of the inventive concept employ intra-frame varied analog binning to reduce the size of data to be processed in an image sensor. Regions of interest (ROIs) of a captured scene may be assigned a lower analog binning factor (higher resolution) than remaining regions such as backgrounds constituting the majority of a scene, thereby reducing the size of processed data. This allows for: (i) reduced power consumption within the sensor; (ii) the performance of additional processing tasks on sensor as desired; and/or (iii) an increase in the frame rate without exceeding a power consumption budget.

In an aspect, an image processing method performed with an image sensor having a pixel array involves obtaining at least one frame of a scene using the pixel array. At least one region of interest (ROI) is identified within the frame. For subsequent frames of the scene, the pixel array is controlled to perform high resolution imaging with respect to the at least one ROI and low resolution imaging using analog binning with respect to remaining regions of the frames. Image data obtained from the pixel array may be provided in pipelines according to the same resolution. Each of the pipelines may be digitally processed separately to provide a low resolution group of image data and at least one high resolution group of image data.

In some examples, the at least one ROI includes a first ROI and a second ROI; a first analog binning factor is applied with respect to the first ROI; a second, higher binning factor is applied with respect to the second ROI; a third binning factor higher than the second binning factor is applied with respect to the remaining regions.

In some examples, the at least one high resolution group of image data is digitally binned at a binning factor sufficient for matching the low resolution imaging based on the analog binning, to provide digitally binned image data. The low resolution group of image data is stitched together with the digitally binned image data to form a unified frame to be displayed. A picture in picture (PIP) frame is generated using the remaining regions represented in the unified frame as background image elements and at least one high resolution window corresponding to the at least one high resolution group of image data as a foreground image. The high resolution window may be "smart zoomed".

In another aspect, an image sensor includes a pixel array and at least one image processor. The at least one image processor may execute instructions to: (i) obtain at least one frame of image data of a scene read out from the pixel array; (ii) obtain subsequent frames of the scene, which comprises controlling the pixel array to perform high resolution imaging with respect to at least one region of interest (ROI) of the scene, and low resolution imaging using analog binning with respect to remaining regions of the frames outside the at least one ROI; (iii) provide image data obtained from the pixel array in pipelines according to the same resolution; and (iv) digitally process each of the pipelines separately to provide a low resolution group of image data and at least one high resolution group of image data.

In yet another aspect, a camera apparatus includes a lens, a display, an image sensor, and at least one processor. The at least one processor executing instructions to: (i) obtain at least one frame of image data of a scene read out from the pixel array; (ii) identify a plurality of regions of interest (ROIs) within the at least one frame; (iii) obtain subsequent frames of the scene, which comprises controlling the pixel array to perform first resolution imaging with respect to a first group of the ROIs, second resolution imaging with respect to a second group of the ROIs, and third resolution imaging with respect to a background region of the frames outside the plurality of ROIs, wherein the first and second resolutions are different from each other, the third resolution is lower than each of the first and second resolutions, and each group of the ROIs comprises one or more ROIs; (iv) provide image data obtained from the pixel array in pipelines each corresponding to image data imaged using one of the first, second or third resolutions; and (v) digitally process each of the pipelines separately to provide at least first, second and third resolution groups of image data to be displayed on the display.

In still another aspect, an image sensor includes a pixel array and at least one image processor. The at least one image processor executes instructions to: (i) obtain at least one frame of image data of a scene read out from the pixel array; (ii) obtain subsequent frames of the scene, which includes controlling the pixel array to perform first high resolution imaging, without analog binning, with respect to at least one first region of interest (ROI) of the scene, perform second high resolution imaging with respect to at least one second ROI of the scene, using analog binning at a first analog binning factor, and perform low resolution imaging using analog binning at a second, higher binning factor with respect to a background region of the scene outside the at least one first ROI and the at least one second ROI; (iii) provide image data obtained from the pixel array in pipelines according to the same resolution; and (iv)

digitally process each of the pipelines separately to provide a low resolution group of image data corresponding to the background region, a first high resolution group of image data corresponding to the at least one first ROI, and a second high resolution group of image data corresponding to the at least one second ROI.

BRIEF DESCRIPTION OF THE DRAWINGS

The above and other aspects and features of the disclosed technology will become more apparent from the following detailed description, taken in conjunction with the accompanying drawings in which like reference characters indicate like elements or features. Various elements of the same or similar type may be distinguished by annexing the reference label with a second label that distinguishes among the same/similar elements (e.g., $p_{1,1}$, $p_{i,j}$). However, if a given description uses only the first reference label (e.g., p) it is applicable to any one of the same/similar elements having the same first reference label irrespective of the second label.

DETAILED DESCRIPTION OF EMBODIMENTS

The following description, with reference to the accompanying drawings, is provided to assist in a comprehensive understanding of certain exemplary embodiments of the inventive concept disclosed herein for illustrative purposes. The description includes various specific details to assist a person of ordinary skill in the art with understanding the inventive concept, but these details are to be regarded as merely illustrative. For the purposes of simplicity and clarity, descriptions of well-known functions and constructions may be omitted when their inclusion may obscure appreciation of the inventive concept by a person of ordinary skill in the art.

Figure 1:
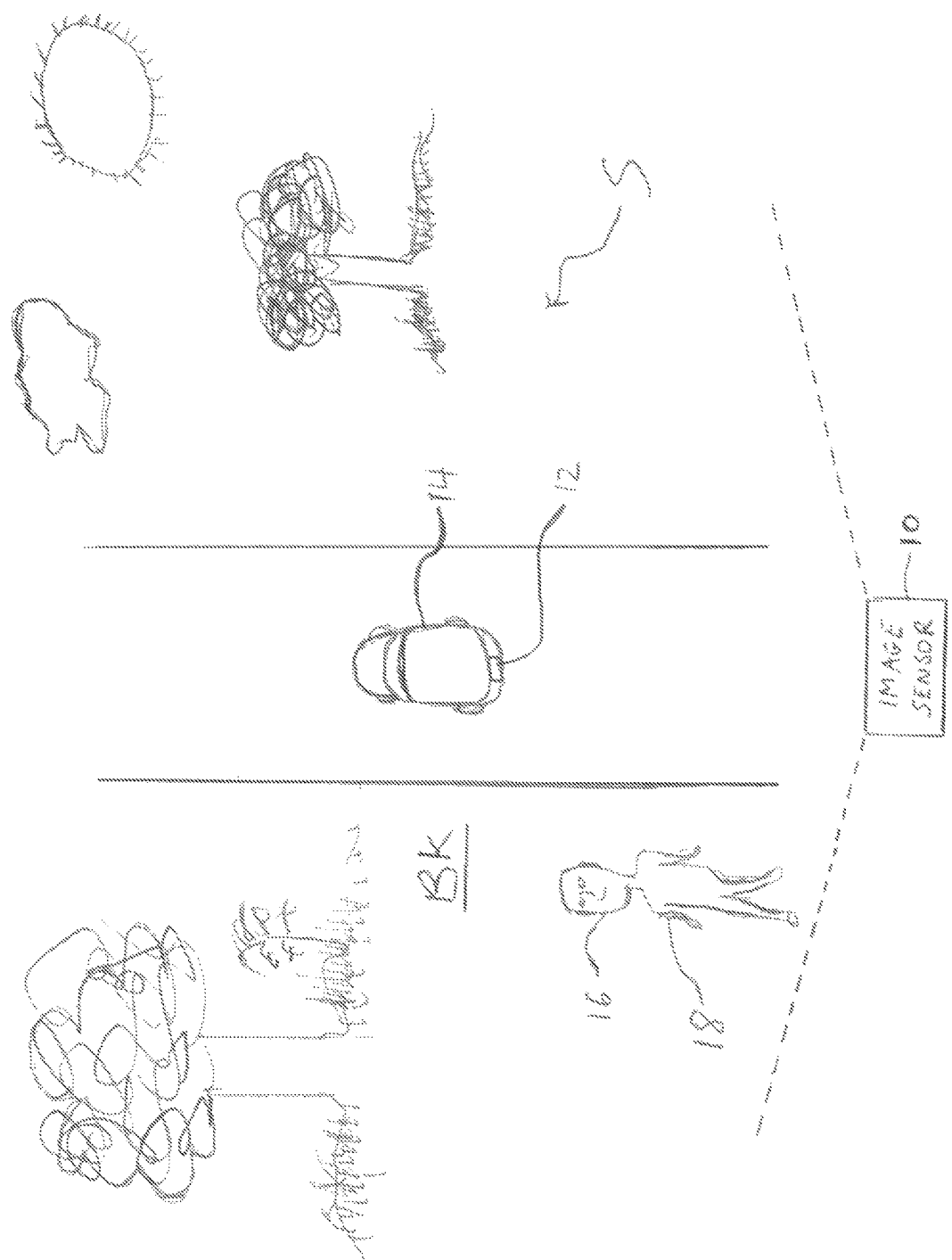
FIG. 1 shows an example scene that may be captured by an image sensor using a varied intra-frame analog binning method according to an embodiment.

FIG. 1 shows an example scene that may be captured by an image sensor using a varied intra-frame analog binning method according to an embodiment. A scene S imaged by an image sensor 10 may include at least one region of interest (ROI) automatically identified or selected by a user of a camera system that comprises image sensor 10. For instance, an image processor within image sensor 10, or a processor of the camera system may execute a software application that automatically detects and tracks vehicles and their license plates during continuous video capture at a low resolution. The scene S may contain a vehicle 14 with a license plate 12 and the application may be designed to identify a first ROI corresponding to the vehicle and a second ROI corresponding to the license plate. The remainder of the scene, which may constitute the majority of each frame, is designated background BK. The application may control image sensor 10 to capture subsequent frames of the scene by imaging the background BK in a lowest resolution; imaging the vehicle 14 at an intermediate resolution; and the license plate 12 at a highest resolution. Another application may be designed to identify a first ROI corresponding to a person's body 18 and a second ROI corresponding to the person's face 16, and these ROIs may similarly be captured in an intermediate resolution and a highest resolution, respectively, as compared to the lowest resolution used for imaging the background BK.

In the following discussion and elsewhere herein, any imaging resolution higher than the lowest resolution applied in a frame may be referred to interchangeably either as an "intermediate resolution" or as a "high resolution".

Image sensor 10 is configured to dynamically implement variable intra-frame analog binning to attain corresponding degrees of resolution from region to region of an imaged frame according to control signals applied to a pixel array within image sensor 10. With analog binning within image sensor 10, charges from adjacent grouped pixels are summed or averaged (and optionally weighted in either case) and reported out as data of a single grouped pixel block, which may also be called a "superpixel" or macroblock. Analog binning thus reduces the total amount of data generated and read out by image sensor 10, thereby reducing power consumption in readout circuitry and processing circuitry of image sensor 10. A higher analog binning factor corresponds to a higher unit number of pixels grouped for charge sharing, and a lower resolution. Analog binning may also involve skipping pixels within a grouped pixel block; in this case, the readout data for a superpixel actually represents only a fraction of the captured image data for that block. (In an extreme case, data of just a single pixel may be used to represent a group of adjacent pixels, so that the "analog binning" essentially becomes a "skipping" method.) Whatever analog binning method is employed, setting a highest analog binning factor (lowest resolution) for the background BK may significantly reduce power consumption for image sensor 10 as well as reduce the "h-time" (horizontal row read-out time) due to a smaller size of data being processed. This allows for reducing a data transmission rate from the pixel array, increasing the frame rate, and/or for performing more complicated tasks "on sensor" (within the circuitry of image sensor 10).

Setting a low resolution full field of view image may be useful as a wide image for display or mapping an environment and for searching for larger objects. In an embodiment, a full low resolution image is used for identifying a vehicle and a license plate while high resolution imaging and subsequent digital zooming is used to detect numbers and letters on the license plate. In a security application example, a full low resolution image is used for identifying human bodies while a high resolution image is used for identifying faces.

Setting a lowest analog binning factor to ROIs for which a highest resolution is desired, such as license plate 12 or face 16, is more data intensive but may capture desired information according to the application with a requisite detail. (Note that a "lowest analog binning factor" may be a binning factor of 1.0, which corresponds to zero analog binning. In other words, when a binning factor of 1.0 is applied to a region, charges are not shared between adjacent pixels, but instead data from each pixel of the region is read out individually.) High resolution ROIs may be used to capture details for use cases such as object/text recognition anywhere in the field of view.

In one embodiment, image sensor 10 outputs data in pipelines according to just two resolutions—a first resolution for the ROI(s) and a second, lower resolution for the remaining regions, e.g., background BK. In other embodiments, data is generated and output in three or more resolutions—a highest resolution for a first type of ROI, one or more intermediate resolutions for at least one second type of ROI, and a lowest resolution for remaining regions.

Figure 2:
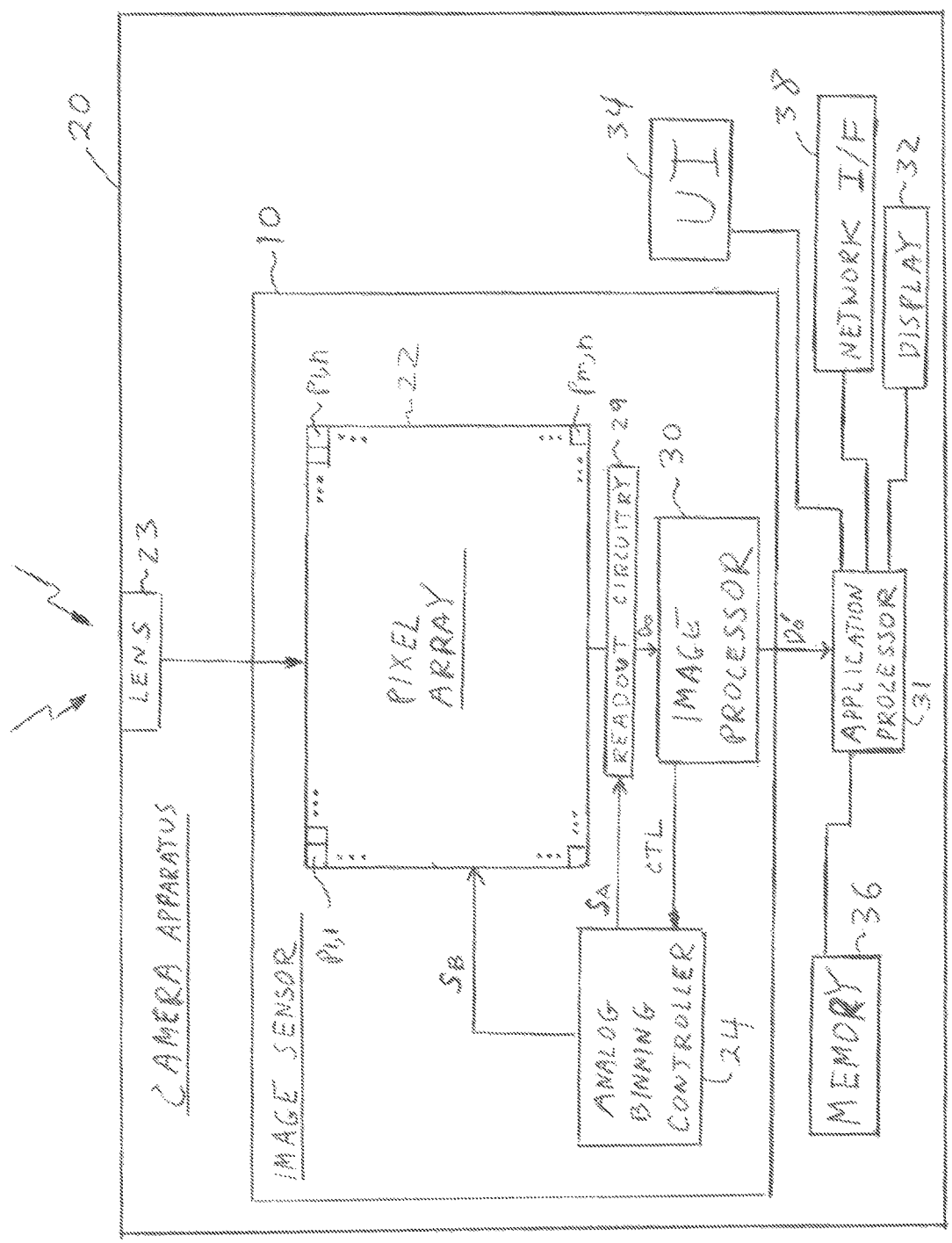
FIG. 2 is a block diagram illustrating example components of a camera system with an image sensor in accordance with an embodiment.

FIG. 2 is a block diagram illustrating example components of a camera apparatus 20 including an image sensor 10 according to an embodiment. Camera apparatus 20 may further include a lens 23, an application processor (AP) 31, a memory 36, a user interface (UI) 34, a display 32 and a network interface 38. Camera apparatus 20 may be any of a variety of camera-equipped apparatuses such as a security system computer/display system, a mobile device, a hunting camera device, a street lamp mounted camera device, and so forth. Image sensor 10 may include a pixel array 22, an analog binning controller 24, readout circuitry 29, and an image processor 30. Pixel array 22 may include (m×n) pixels $p_{1,1}$ through $p_{m,n}$ arranged in rows and columns. In other embodiments, the pixels p are not arranged in rows and columns and/or the pixel array 22 has a non-rectangular profile such as circular. For instance, pixels p may be arranged in a staggered or non-uniform configuration rather than a row by column grid arrangement as shown in FIG. 2. In any case, a typical image sensor 10 may include thousands or up to several million pixels p. Each pixel p may be a monochrome pixel or a chromatic-specific sub-pixel providing data of a predetermined color, e.g., R, G or B; or R, G, B and W (white); or pixels of another suitable color combining scheme. Analog binning in a color-imaging image sensor involves summing or averaging charges of groups of adjacent sub-pixels providing luminance data of the same color.

AP 31 may control the overall operations of camera apparatus 20. To this end, AP 31 may communicate control and data signals to each of image processor 30, memory 36, UI 34, network I/F 38 and display 32. Other types of processors may be substituted for AP 31, e.g., for fixed location camera devices.

Image processor 30 may send control signals CTL to controller 24 indicating analog binning factors to be used for specific regions of a current frame. Such control signals may be sent on a frame by frame basis, considering that ROIs may appear, move and disappear from one frame to the next. To this end, control signals CTL may indicate pixel address boundaries of ROIs, the analog binning factor to be applied to the respective ROIs, and the analog binning factor to be applied to remaining regions. For instance, a detection and tracking algorithm may be run by image processor 30 in some embodiments, and by AP 31 in other embodiments, to detect and track ROIs. The pixel address boundaries of the ROIs may be determined through the execution of the detection and tracking algorithm. ROIs may also or alternatively be identified through user input from UI 34 (e.g. routed through AP 31). Control signals CTL may also include a field indicating a frame transmission rate at which frames are to be output by pixel array 22. It is noted here that memory 36, shown externally of image sensor 10, may alternatively be part of image sensor 10, and camera system 20 may include additional memory to store program instructions read by AP 31, and carry out various storage functions controlled by AP 31 such as video data and program data storage.

Controller 24 may respond to control signals CTL by generating timing and control signals $S_B$ which are applied to control lines of pixel array 22 connected the individual pixels to implement the variable analog binning at the designated frame rate. Controller 24 may also generate timing and control signals $S_A$ to readout circuitry 29 to carry out proper data readout. To this end, pixel array 22 may include inter-pixel switches to selectively form pixel groups for charge sharing according to the analog binning. Control signals $S_B$ may control both the states of the inter-pixel switches and the timing of the pixel data readout from pixel array 22. For instance, control signals $S_B$ may sequentially activate rows of pixel array 22 to enable readout in the column direction, and control signals $S_A$ may sequentially activate switches within readout circuitry 29 to cause readout circuitry to output one or more serial data streams as analog data $D_O$.

As pixel array 22 collects images of the scene through lens 23, it generates analog data $D_O$ representing the frame image and outputs the same to image processor 30 through readout circuitry 29. Readout circuity 29 may include sampling circuitry, e.g., correlated double samplers (CDSs), for sampling the analog data read out from pixel array 22, analog to digital (ND) converters to A/D convert the sampled data to digital data $D_O$, and memory for buffering the digital data. Image processor 30 may convert the digital data $D_O$ to data organized in pipelines according to the same binning factor. The digital data may then be further processed by image processor 30 as described below to generate corresponding output data $D_O'$ to AP 31. AP 31 may output corresponding image data (with or without further processing) to display 32, memory 36, and/or an external device at a local or remote location through network I/F 38.

Figure 3:
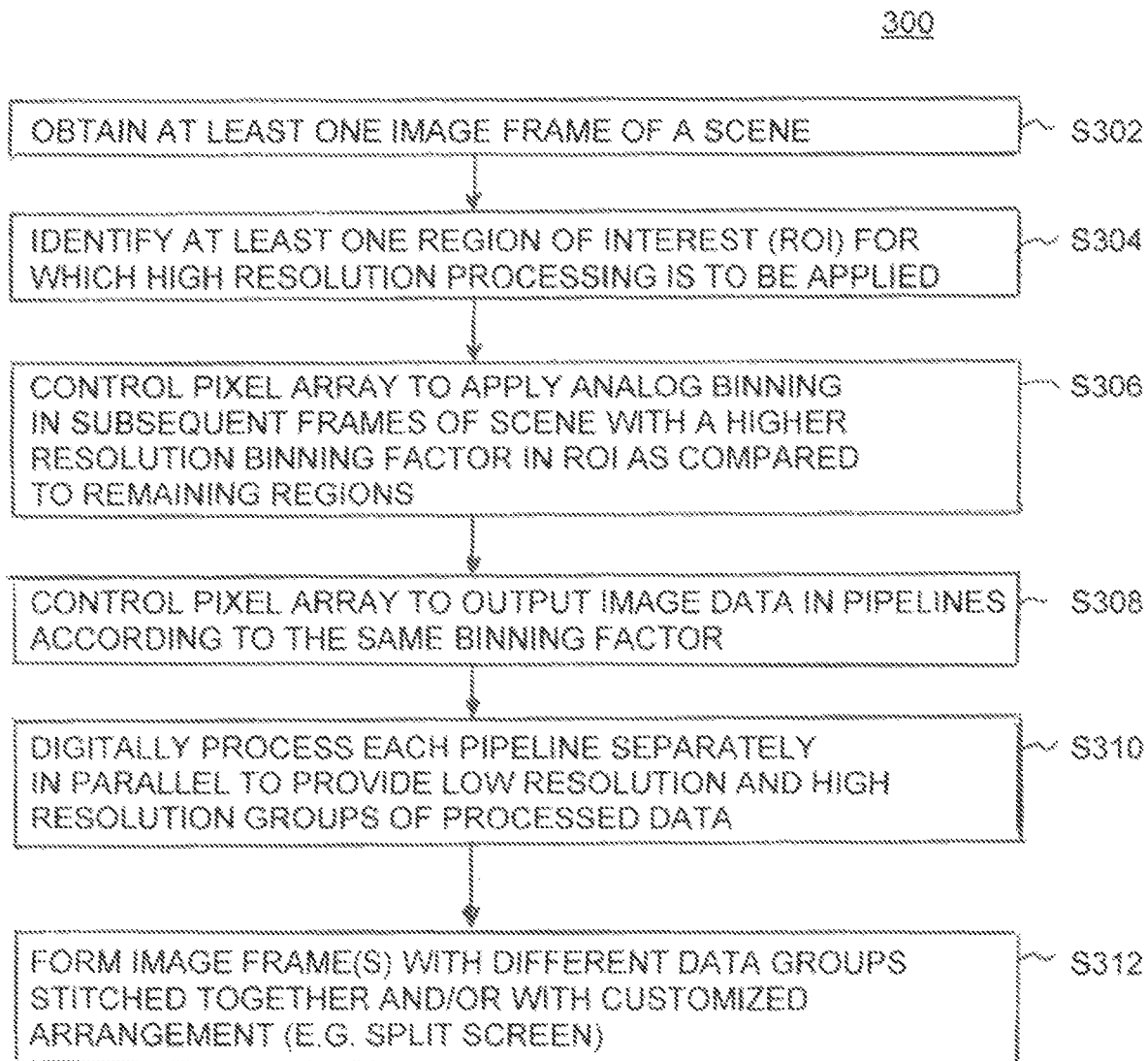
FIG. 3 is a flowchart of an example image processing method performed by a camera system according to an embodiment.
Figure 4:
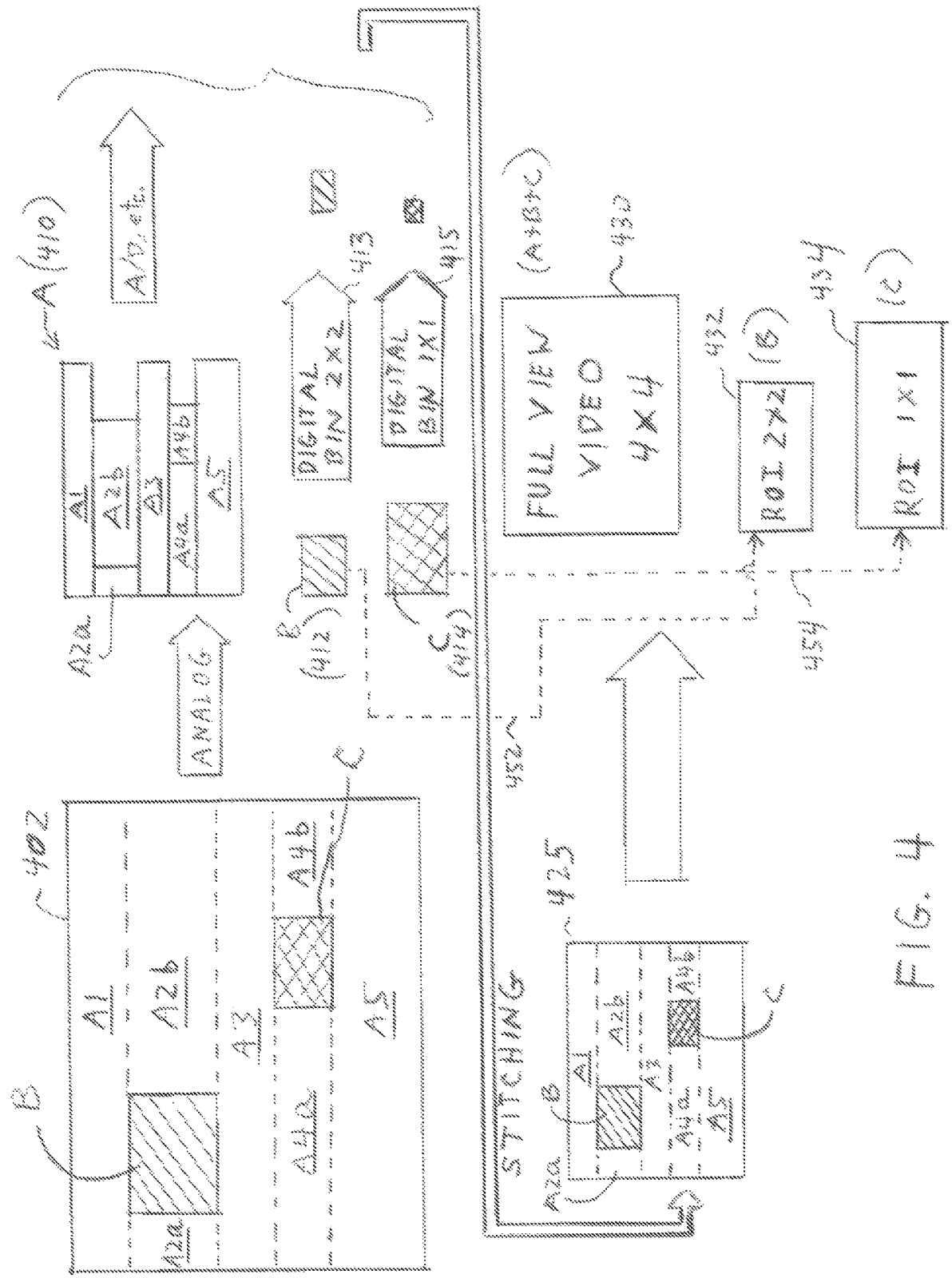
FIG. 4 is a diagram illustrating example frames and pipelines that may be generated with the method of FIG. 3.

FIG. 3 is a flowchart of an example image processing method 300 performed by camera system 20 according to an embodiment. FIG. 4 is a diagram illustrating example frames and pipelines that may be generated with the method of FIG. 3. The example of FIG. 4 is for a case of three resolutions; however, the number of resolutions to be allocated to different types of ROIs may differ in other embodiments. The number of parallel pipelines of data output by image sensor 10 may equal the number of resolutions. Any number of ROIs may be identified and processed in other examples.

Referring to FIGS. 3 and 4, in method 300, image sensor 10 may first obtain one or more initial frames of a scene from which to identify potential ROIs (operation S302). For instance, video frames may be initially captured at a low resolution by applying a uniform, high binning factor to all pixels of the initial frames. Image processor 30 or AP 31 may continually analyze the low resolution video frames to search for objects of a predetermined type corresponding to ROIs according to an application program running in image processor 30 or AP 31. Once identification is made for one or more such objects for which high resolution processing is to be applied, such as a vehicle or a human body, ROI boundaries may be defined for that object(s) (S304). For instance, ROIs may be designated as rectangular regions surrounding each object, such as regions A and B of a frame 402 (FIG. 4). Alternatively, ROIs are designated as non-rectangular regions conforming more closely to the boundaries of the objects of interest. The example of FIG. 4 shows just two ROIs corresponding to regions A and B for simplicity of explanation; however, a scene may contain multiple ROIs of the same type and designated resolution. Image data for ROIs assigned the same resolution may be grouped and processed together as explained below.

With ROIs thus identified, pixel array 22 may be controlled via control signals $S_B$ to apply analog binning in subsequent frames of the scene with a higher resolution binning factor in the ROIs as compared to remaining regions of the frames, e.g., background regions (S306). As noted earlier, in some embodiments certain types of ROIs may be assigned a higher resolution (corresponding to a lower binning factor) than other types of ROIs. The example of FIG. 4 assumes that frame 402 is a frame following the initial frame(s); region C is a first type of ROI, such as a license plate, to be processed at a highest resolution; region B is a second type of ROI to be processed at an intermediate resolution; and region A, composed of sub-regions A1, A2 (=A2a, A2b), A3, A4 (=A4a, A4b) and A5, is a remaining region to be processed at a lowest resolution. As an example to illustrate intra-frame varied analog binning to generate the locally varied resolution across a frame, it will be assumed in the following discussion that a binning factor of 1.0 is applied to region C (no analog binning takes place); a binning factor of 2.0 is applied to region B; and a binning factor of 4.0 is applied to region A. These binning factors are merely examples; other embodiments may apply different sets of binning factors, which may include odd numbered binning factors. With a binning factor of 4.0, pixel blocks in sets of 4×4 pixels are each assigned a single grayscale value. For instance, for each 4×4 pixel block, a single pixel value may be read out, representing an average intensity value for the 16 pixels of the block. In this discussion, a "pixel" may be a sub-pixel providing a particular color, e.g., blue, green or red, of a multi-color combination pixel. For color-capable image sensors, a 4×4 pixel block may group 16 sub-pixels providing the same color. A binning factor of 2.0 corresponds to pixel blocks of 2×2 pixels being assigned the same grayscale value, and a binning factor of 1.0 means that each pixel in the region is assigned its original grayscale value, i.e., no analog binning is applied. Thus, the amount of image data output for region A, as compared to the highest resolution case of region C, is reduced by a factor of 16. Similarly, the amount of image data for region B is reduced by a factor of 4 compared to the highest resolution case.

It should be noted that once an ROI is initially identified in any given frame, image processor 30 may run a tracking algorithm to track the ROI's motion from frame to frame. Hence the pixel boundaries of the ROI may change from one frame to the next. Image processor 30 may therefore apply updated control signals CTL indicating pixel boundary addresses or the like every frame or every K frames, where K is two or more.

With ROI boundaries and types so identified and corresponding analog binning factors applied, the pixel array 22 is controlled to output image data in pipelines according to same binning factor (S308). Thus, in the example of FIG. 4, pixel array 22 may produce three parallel pipelines of data: a first pipeline 410 for region A, a second pipeline 412 for region B, and a third pipeline 414 for region C.

In the example of FIG. 4, in frame 402, region B is between sub-regions A2a and A2b, occupying the same rows. Region B is also beneath region A1 and above A3. Similarly, region C is between A4a and A4b in the same rows, and is between A3 and A5 in the column direction. Therefore, the pipeline 410 for region A may be organized as a sequence of data with the regions B and C removed. As shown, one example sequence is depicted as a concatenation of sub-regions A1, A2a, A2b, A3, A4a, A4b and A5. For instance, the pipeline 410 may be data output row by row, beginning with the top row of A1, continuing to the bottom row of A1, followed by the top row of A2a, the top row of A2b, the second row of A2a, and so on. The pipelines 412 and 414 for regions B and C may similarly be comprised of data read out row by row. The geometrical sizes depicting the pipelines 410, 412 and 414 generally reflect the amount of data in the pipelines. If a set of separated ROIs of the same type (e.g. multiple ROIs of the region C type) are assigned the same binning factor, the same data concatenation method of organizing pipeline data as described above for region A may be used to form the pipeline for the set of ROIs. In other words, if there are multiple ROIs assigned the same resolution, a single pipeline may be produced for the same-resolution ROIs. For example, if there are multiple regions C, each corresponding to an object type assigned the same resolution, the data from all of the regions C may be grouped into the same third pipeline 414 with the use of appropriate metadata to identify the different ROIs and their boundaries. Note that pipeline sequences may be organized differently in other embodiments, such as by first concatenating all data in complete rows (e.g. data of regions A1, A3 and A5) and concatenating data in segmented rows in a separate portion of the pipeline for that binning factor.

Each pipeline of analog data may then be sampled, analog to digital (A/D) converted, and digitally processed separately in parallel to provide low resolution and high resolution groups (e.g. pipelines) of processed data (S310). For example, the low resolution and high resolution groups of FIG. 4 may be the pipelines 410 and 414, respectively. The sampling and A/D conversion to digital data may occur in readout circuitry 29. Optionally, one or more intermediate resolution processed data groups (e.g., pipeline 412 for region B) are also generated. Some examples of such digital processing that may be performed on each set of pipelines for ROIs with an identical binning factor include defect correction, noise reduction, and remosaicing. Remosaicing may involve image processor 30 executing an algorithm that transforms an image format used to provide the analog data to a common sensor output format.

The processed data of the different data groups may then be organized in frames to be displayed (S312), which may be accomplished in several ways. In one example, a unified image may be created at the lowest resolution, unifying the ROIs and the remaining regions in their respective locations of the originally captured image. To create the unified image, the digital data group for each ROI can be digitally binned to generate pixel regions for display at the lowest resolution. In the example of FIG. 4, the digital data representing region B may be binned (413) at a binning factor of 2.0, and the digital data representing region C may be binned (415) at a binning factor of 4.0, to match the lowest resolution of region A. The digital binning applied to the ROI regions may be accomplished in an analogous manner as was done for the low resolution region A, e.g., summing or averaging, weighting and/or skipping pixel data in superpixel blocks that are defined digitally. The groups of binned data may then be stitched together according to their positions within the original frame, with the data of the lowest resolution regions (e.g., the sub-regions of region A) to form a unified processing frame 425. This processing chain may align the quality of the analog and digitally binned regions to represent a uniform image and eliminate transitions in image quality between different regions of the image. The processing frame 425 may then be output to display 32 as a full view video frame 430 of a main video stream.

Figure 5:
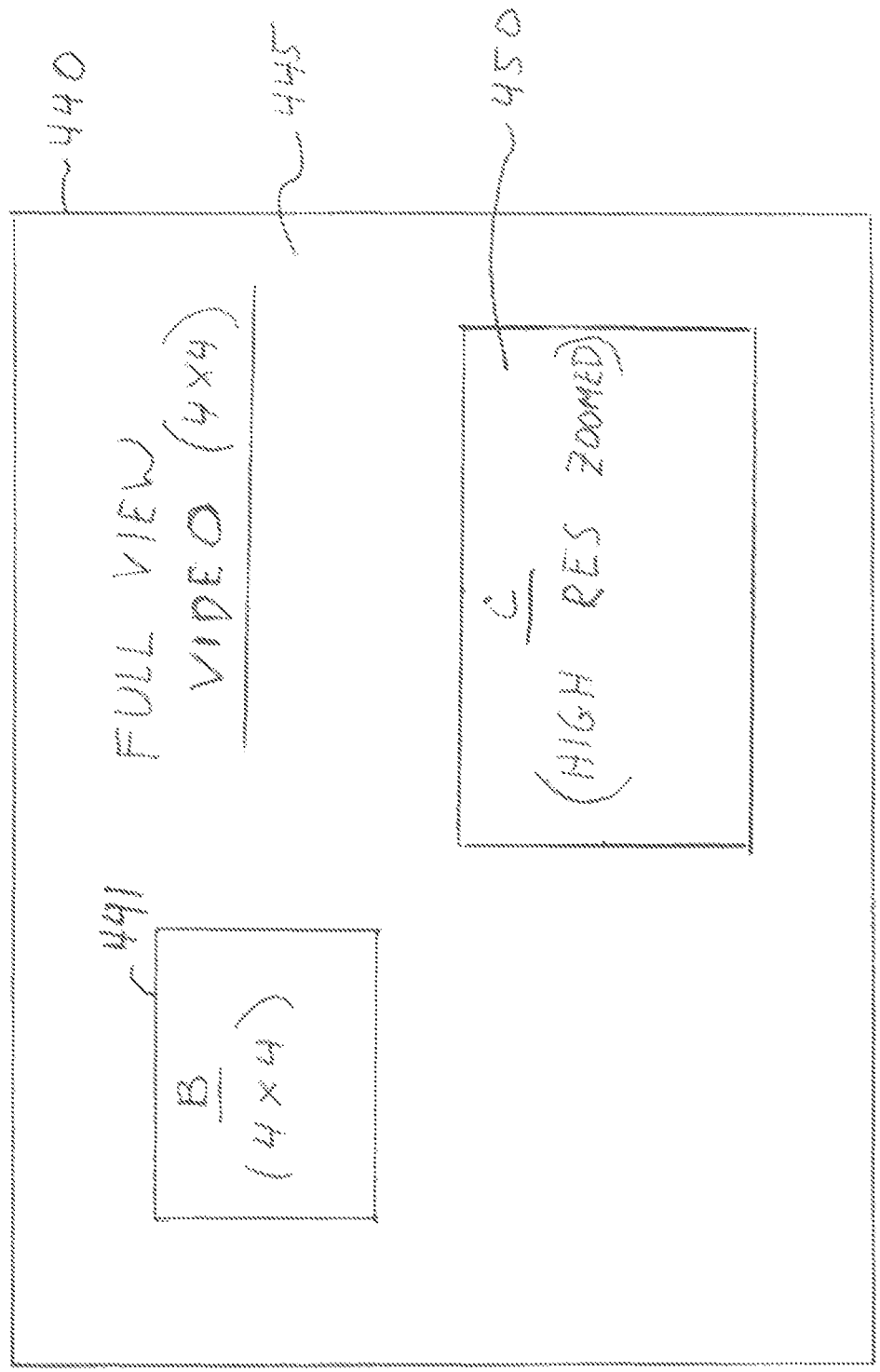
FIG. 5 is an example frame that may be generated in a zoom operation with respect to an ROI.

Meanwhile, the high resolution data of the ROIs, prior to being digitally binned to form the unified frame, may be processed separately as indicated by processing paths 452 and 454 to provide high resolution ROI windows 432 and 434. Depending on the application or user commands via UI 34, high resolution ROI windows 432 and 434 may either be displayed in separate frames at their respective high resolutions, or superposed with the full view video frame 430 as PIP windows, or displayed in a split screen side by side with a portion of the full view video frame 430. For instance, FIG. 5 illustrates an example PIP frame 440 that may be generated by image processor 30 based on the full view processing frame 425 and the ROI windows 432, 434, and output for display on display 32. Frame 440 differs from the full view video frame 430 of FIG. 4 by presenting a digitally zoomed (enlarged) region 450 for ROI "C", where the digital zooming is based on the high resolution data. In other words, the enlarged region 450 is enlarged relative to its original size in relation to the background image elements (region A) of the unified frame 425, and is a foreground image covering a portion of the original region A. Here, the zooming of ROI "C" may have been initiated by user input through UI 34, or performed automatically based on a detected ROI type or other predetermined condition of an application running on image processor 30. Meanwhile, ROI "B" in window 441 may be displayed at the lowest resolution (as illustrated), matching that of the full view video, or may be displayed at its original high resolution to present sharper details, or displayed at an in-between resolution, depending on the application or user commands. The technique of selectively zooming different ROIs may be referred to as "smart zoom". In accordance with the inventive concept, such smart zoom operations may be performed at selective resolutions for the various ROIs.

Figure 6A:
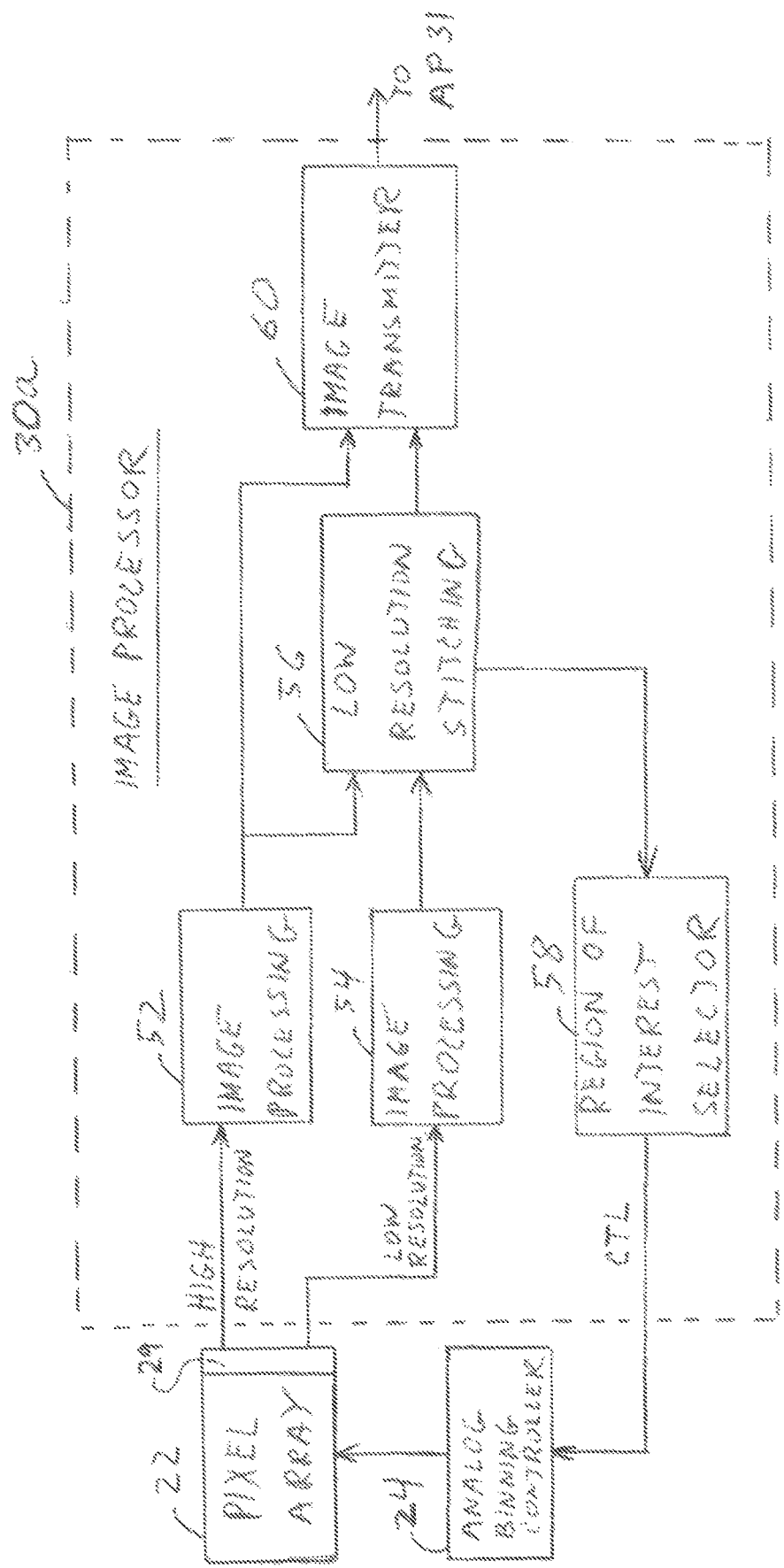
FIG. 6A is a functional block diagram of an example image processor of an image sensor according to an embodiment.

FIG. 6A is a functional block diagram depicting blocks of circuitry within an image processor 30a, which is one example of image processor 30 discussed above. Image processor 30a includes a high resolution image processing ("high res IP") block 52, a low resolution image processing ("low res IP") block 54, a low resolution stitching block 56, a region of interest (ROI) selector 58, and an image transmitter 60. Low res IP block 54 performs the above-described processing of the low resolution data output from pixel array 22 (data from regions allocated the highest analog binning factor). High res IP block 52 processes the high resolution data output from pixel array 22, representing the ROIs (where high resolution is considered anything higher than the lowest resolution applied throughout the frame). As mentioned, such processing may involve A/D conversion (if not already done by readout circuitry 29), defect correction, noise reduction, and remosaicing. If there are ROIs allocated different binning factors, high res IP block 52 may internally process the data of the same binning factor together, and output parallel data pipelines, each carrying data generated with the same binning factor. The one or more high resolution data pipelines from IP block 52 may be output to both low resolution stitching block 56 and image transmitter 60.

Low resolution stitching block 56 may perform the digital binning of the high resolution data from the ROIs to convert the same to low resolution data, and stitch this data with the low resolution data output from low res IP block 54 to generate full frame video at low resolution. The full frame video may be output to both image transmitter 60 and ROI selector 58. ROI selector 58 may continually detect and track ROIs frame by frame and output the control signals CTL to analog binning controller 24 discussed above, controlling the intra-frame varied analog binning and frame rate of pixel array 22. Image transmitter 60 may generate the PIP frames, and output multiple data pipelines, including the PIP frames, to AP 31. One pipeline may carry the full frame video, another pipeline may carry the PIP frames, and at least one other pipeline may carry high resolution data for each set of ROIs at the same resolution. AP 31 may in turn output the PIP frames and/or further modified frames to display 32/network interface 38.

Figure 6B:
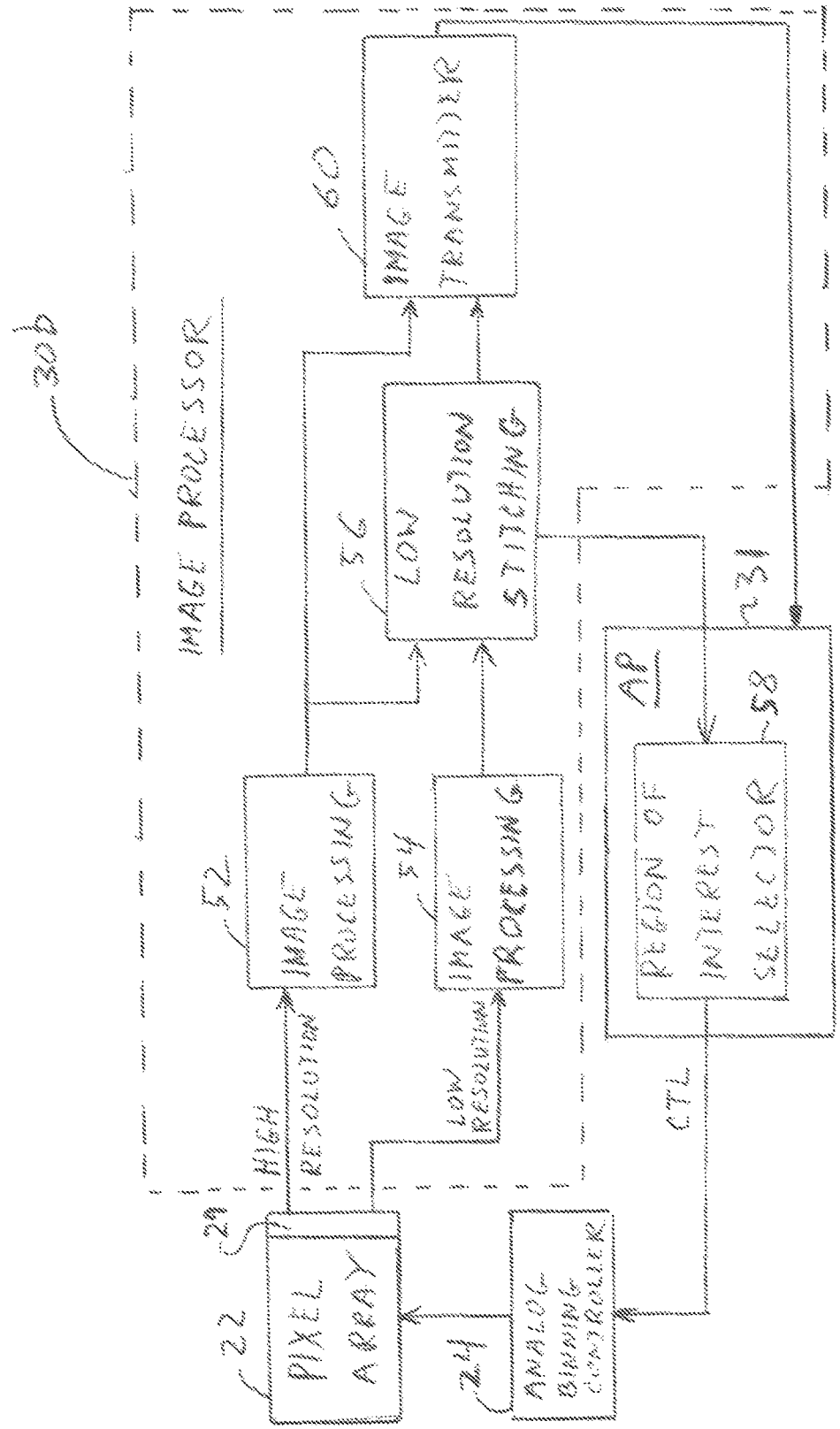
FIG. 6B is a functional block diagram of another example image processor of an image sensor according to an embodiment.

FIG. 6B is a functional block diagram depicting blocks of circuitry within an image processor 30b, which is another example of image processor 30 discussed above. Image processor 30b differs from image processor 30a just described by omitting the region of interest selector 58, which is instead included within AP 31. Thus, the output of low resolution stitching block 56 may be output to image transmitter 60, which in turn sends the stitched low resolution frames to region of interest selector 58 within AP 31. AP 31 may correspondingly supply the control signals CTL to analog binning controller 24 (directly, or through other circuitry within image processor 30b) in accordance with the ROIs continually selected frame by frame. Image transmitter 60 may supply the high resolution frames from high res IP block 52 to AP 31 in the same way as for image processor 30a.

Embodiments of the inventive concept such as those described above may exhibit several advantages over conventional image sensors, camera systems, and methods. For instance, embodiments may enable processing of multiple resolution multi-ROI video streams within the image sensor with relatively low power consumption due to analog binning across the majority portions of the frames. Due to the smaller amount of data to process, embodiments may enable higher frame rate operation and/or perform more complex processing tasks on the sensor. Embodiments may allow for the implementation of "on sensor" smart zoom for multi ROIs in different resolutions, realizing true picture in picture (PIP). Embodiments may also provide high resolution ROIs captured simultaneously and matched to the lower resolution full field of view with little or no frame delay.

Exemplary embodiments of the inventive concept have been described herein with reference to signal arrows, block diagrams (e.g., the flowchart of method 300 and the block diagram for image processor 30a in FIG. 6). Each block of the block diagrams (e.g., any of operations S302 to S312 or any of the blocks 52, 54, 56 and 58 of image processor 30a) and combinations of blocks in the block diagrams, and operations according to algorithmic expressions can be implemented by circuitry (e.g., processing circuitry of image processor 30 in cooperation with memory 36) accompanied by computer program instructions. Such computer program instructions may be stored in a non-transitory computer readable medium (e.g. memory 36) that can direct a computer, other programmable data processing apparatus, or other devices to function in a particular manner, such that the instructions stored in the computer readable medium produce an article of manufacture including instructions which implement the function/act specified in the block diagram.

The term "processor" as used herein is intended to include any processing device, such as, for example, one that includes a central processing unit (CPU) and/or other processing circuitry (e.g., digital signal processor (DSP), microprocessor, etc.). Moreover, a "processor" includes computational hardware and may refer to a multi-core processor that contains multiple processing cores in a computing device. Various elements associated with a processing device may be shared by other processing devices.

While the inventive concept described herein has been particularly shown and described with reference to example embodiments thereof, it will be understood by those of ordinary skill in the art that various changes in form and details may be made therein without departing from the spirit and scope of the claimed subject matter as defined by the following claims and their equivalents.

What is claimed is:

1. A method performed with an image sensor having a pixel array, comprising:
   obtaining at least one frame of a scene using the pixel array;
   identifying at least one region of interest (ROI) within the at least one frame;
   obtaining subsequent frames of the scene, which comprises controlling the pixel array to perform high resolution imaging with respect to the at least one ROI and low resolution imaging using analog binning with respect to remaining regions of the frames outside the at least one ROI;
   providing image data obtained from the pixel array in pipelines according to the same resolution;
   digitally processing each of the pipelines separately, which includes defect correction processing, noise reduction processing, and/or remosaicing processing, to provide a low resolution group of image data and at least one high resolution group of image data; and
   stitching together the low resolution and high resolution groups of image data to form a unified frame to be displayed.

2. The method of claim 1, further comprising:
   forming a picture in picture (PIP) frame using the remaining regions represented in the unified frame as background image elements and at least one high resolution window corresponding to the at least one high resolution group of image data as a foreground image.

3. The method of claim 2, further comprising enlarging the at least one high resolution window relative to its original size in relation to the background image elements.

4. The method of claim 1, wherein the identifying of at least one ROI is performed automatically through commands initiated by a processor executing program instructions to identify particular patterns of image elements as ROIs.

5. The method of claim 1, wherein the identifying at least one ROI is performed through a command initiated by a user interface.

6. The method of claim 1, wherein:
   the at least one ROI comprises a first ROI and a second ROI;
   a first analog binning factor is used for imaging by the pixel array with respect to the first ROI; and
   a second, lower binning factor is used for imaging by the pixel array with respect to the second ROI.

7. The method of claim 6, wherein the first ROI comprises a vehicle and the second ROI comprises a license plate of the vehicle.

8. The method of claim 6, wherein the first ROI comprises a human body and the second ROI comprises a face of the human body.

9. The method of claim 1, wherein the high resolution imaging with respect to the at least one ROI is performed without analog binning.

10. The method of claim 1, wherein no analog binning is applied with respect to the at least one ROI and analog binning factors of two or higher are applied with respect to the remaining regions of the frames.

11. The method of claim 1, wherein:
   the at least one ROI comprises a first ROI and a second ROI separated from the first ROI by a background region; and
   an identical high resolution binning factor is used for imaging by the pixel array with respect to each of the first and second ROIs.

12. The method of claim 1, wherein said digitally processing each of the pipelines separately comprises the defect correction processing.

13. The method of claim 1, wherein the analog binning comprises:
   defining a pixel block of adjacent pixels; and
   at least one of (i) summing; (ii) averaging; and (iii) weighting charges from the pixels of the pixel block; and/or (iv) skipping pixel data of some of the adjacent pixels of the pixel block.

14. The method of claim 13, wherein the digital binning is performed in an analogous manner as the analog binning using the at least one of the (i) summing; (ii) averaging; (ii) weighting; and (iv) skipping.

15. The method of claim 1, wherein said digitally processing each of the pipelines separately includes the remosaicing processing.

16. The method of claim 1, wherein said digitally processing each of the pipelines separately includes the noise reduction processing.

17. A method performed with an image sensor having a pixel array, comprising:
   obtaining at least one frame of a scene using the pixel array;
   identifying at least one region of interest (ROI) within the at least one frame;
   obtaining subsequent frames of the scene, which comprises controlling the pixel array to perform high resolution imaging with respect to the at least one ROI and low resolution imaging using analog binning with respect to remaining regions of the frames outside the at least one ROI;
   providing image data obtained from the pixel array in pipelines according to the same resolution;
   digitally processing each of the pipelines separately to provide a low resolution group of image data and at least one high resolution group of image data;
   stitching together the low resolution and high resolution groups of imaging data to form a unified frame to be displayed; and
   prior to stitching together the low resolution and high resolution groups of image data, digitally binning the at least one high resolution group of image data at a binning factor sufficient for matching the low resolution imaging based on the analog binning;
   wherein the unified frame is stitched together to form a display frame at the same resolution throughout.

18. An image sensor comprising:
   a pixel array; and
   at least one image processor executing instructions to:
   obtain at least one frame of image data of a scene read out from the pixel array;
   obtain subsequent frames of the scene, which comprises controlling the pixel array to perform high resolution imaging with respect to at least one region of interest (ROI) of the scene, and low resolution imaging using analog binning with respect to remaining regions of the frames outside the at least one ROI; and
   digitally bin the at least one high resolution group of image data at a binning factor sufficient for matching the low resolution imaging based on the analog binning, to provide digitally binned image data.

19. The image sensor of claim 18, further comprising:
providing image data obtained from the pixel array in pipelines according to the same resolution; and
digitally process each of the pipelines separately to provide a low resolution group of image data and at least one high resolution group of image data, and
wherein the at least one image processor further executes instructions to identify and track the at least one ROI.

20. The image sensor of claim 18, wherein the at least one image processor further executes instructions to receive boundary information of the at least one ROI from a processor external to the image sensor.

21. The image sensor of claim 18, wherein the at least one image processor further executes instructions to:
stitch together the low resolution group of image data and the digitally binned image data to form a unified frame to be displayed; and
generate a picture in picture (PIP) frame using the remaining regions represented in the unified frame as background image elements and at least one high resolution window corresponding to the at least one high resolution group of image data as a foreground image.

\* \* \* \* \*